United States Patent Office.

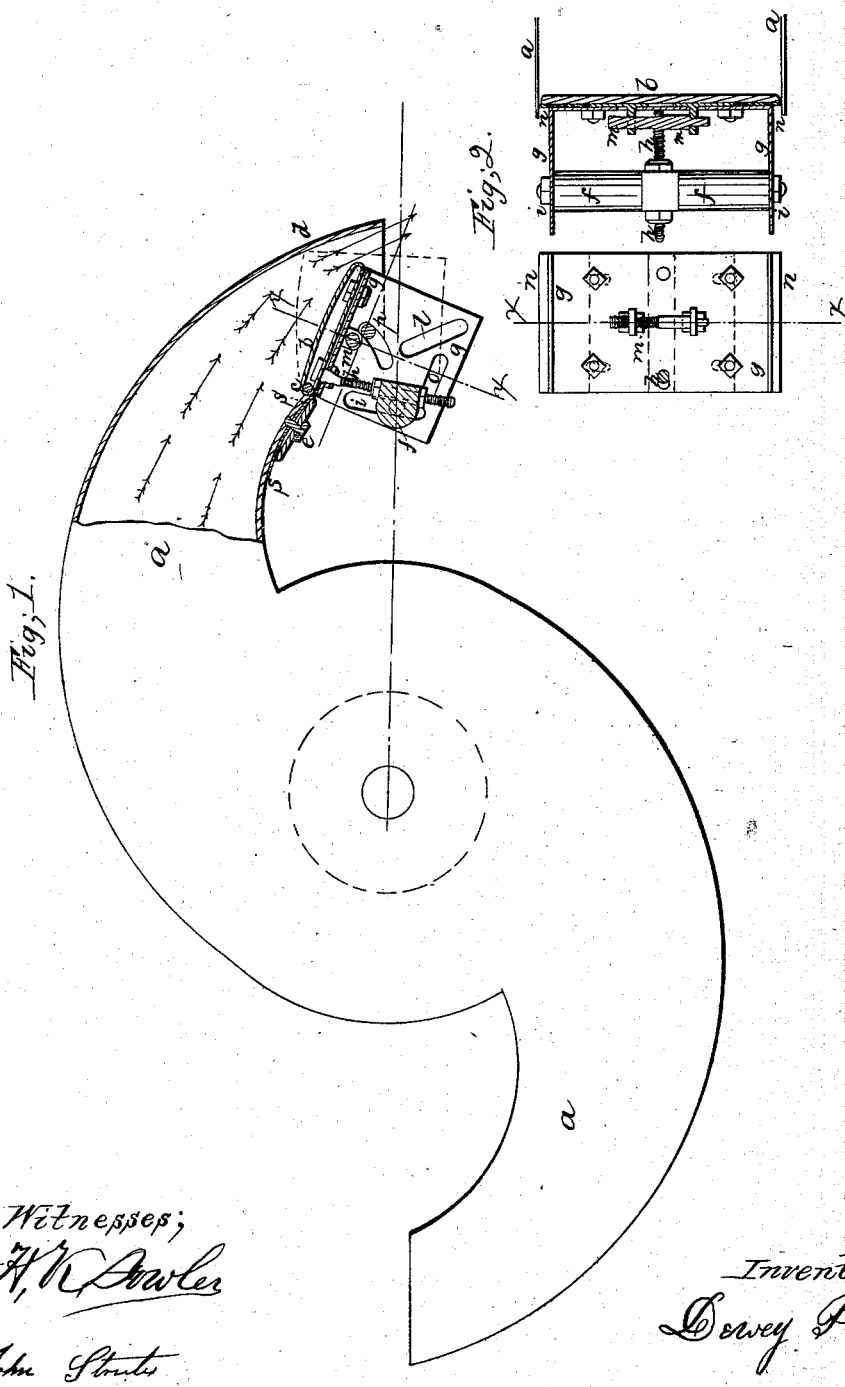

IMPROVEMENT IN REGULATORS FOR REACTION WATER-WHEELS.

DEWEY PHILLIPS, OF MANCHESTER, VERMONT.

Letters Patent No. 60,052, dated November 27, 1866.

SPECIFICATION.

TO ALL WHOM IT MAY CONCERN:

Be it known that I, DEWEY PHILLIPS, of Manchester, in the county of Bennington, and State of Vermont, have invented and made a certain new and useful Improvement in Regulators for Reaction Water-Wheels; and I do hereby declare the following to be a full, clear, and exact description of the said invention, reference being had to the annexed drawing, making part of this specification, wherein—

Figure 1 is a plan of a reaction water-wheel in outline, showing my improvements as applied to one of the water-ways.

Figure 2 is an elevation of the valve, detached; and

Figure 3 is a section at the line $x$ $x$, figs. 1 and 2.

Similar marks of reference denote the same parts.

The nature of my said invention consists in a valve for regulating the size of the discharge orifice from a reaction water-wheel, said valve being moved by centrifugal force, so as to lessen the opening when the velocity increases, and increase that opening when the velocity lessens, so as to make the speed of the wheel under varying loads nearly uniform.

In the drawings, $a$ $a$ are the water-ways of any usual reaction water-wheel, fitted in any well-known manner. $b$ is a valve, hung on pivots or journals, $c$, in the top and bottom plates of the water-way $a$. The valve $b$ is free to swing, and closes against the side $d$ of the water-way when in the position shown by dotted lines in fig. 1. The valve, at its vertical hinge $c$, is kept from leaking by a strip of leather or similar elastic material, $s$, the edge of which is pressed to the hinge, $c$, of the valve, and to the inner side of the water-way, by a plate and screw at $e$. The shape and material from which this valve is made may vary, and be adapted to the circumstances under which it is employed. If made sufficiently heavy in itself, and placed at the proper angle to a radial line from the centre of the wheel, its own centrifugal force, as the wheel revolves, will resist the action of the escaping water in proportion to the velocity of the wheel, and hence give a greater opening for the escape water and an increased power to the wheel, if the speed of the wheel is lessened, or diminish the opening for the water and lessen its power when the wheel increases in velocity, thus regulating the motion of the wheel. I find that it is convenient, however, to have a movable weight, $f$, projecting from the valve, in order that its centrifugal force may act to move the valve, and by placing said weight at greater or less distances from a radial line passing through the valve when closed, so its action to close the valve by the centrifugal force will be greater or less. This weight may be applied in any desired manner; but I have shown it as sustained between a double angle-iron $g$, bolted to the back of the gate, said weight being held by a bolt $h$ and nuts, and its ends bolted through slots $i$ $i$ in said angle-iron; or said weight may be placed so that its ends shall be bolted through the slots $o$ or $l$. Between the angle-iron plate $g$ and valve or gate $b$, I introduce leather or other elastic material, to form a packing, $n$, against the inner sides of the water-way, (see fig. 3,) and these packings may be pressed out, as they wear away, by follower-plates between $b$ and $g$, acted upon by the screw $m$, that is placed between lugs projecting from such follower-plates, through slots in the plate $g$. A bolt is provided at $p$, passing through slots in the projecting plates $g$, and through the water-ways $a$, to prevent the valve $b$ opening too far under very slow motion of the wheel.

What I claim, and desire to secure by Letters Patent, is—

1. A valve or gate, hinged at or near the end of the water-way in a reaction water-wheel, to regulate the opening for the escape of the water in proportion to the centrifugal force resulting from the rotation of the wheel acting upon such valve or gate, to close the same, substantially as specified.

2. I claim the valve or gate, hinged as specified, in combination with the elastic or yielding packing $n$ and $s$, substantially as specified.

DEWEY PHILLIPS.

Witnesses:
H. K. FOWLER,
JOHN STREETER.